(12) United States Patent
Pekrul et al.

(10) Patent No.: US 11,643,962 B2
(45) Date of Patent: *May 9, 2023

(54) SYSTEM AND METHOD FOR LOW CO EMISSION ENGINE

(71) Applicant: Kohler Co., Kohler, WI (US)

(72) Inventors: Eric Pekrul, Kohler, WI (US); Martin L. Radue, Plymouth, WI (US)

(73) Assignee: KOHLER CO.

( * ) Notice: Subject to any disclaimer, the term of this patent is extended or adjusted under 35 U.S.C. 154(b) by 0 days.

This patent is subject to a terminal disclaimer.

(21) Appl. No.: 17/486,092

(22) Filed: Sep. 27, 2021

(65) Prior Publication Data

US 2022/0010716 A1    Jan. 13, 2022

Related U.S. Application Data

(63) Continuation of application No. 16/318,123, filed as application No. PCT/US2017/047561 on Aug. 18, 2017, now Pat. No. 11,149,617.

(Continued)

(51) Int. Cl.
*F01N 11/00* (2006.01)
*F01N 3/10* (2006.01)
(Continued)

(52) U.S. Cl.
CPC ............ *F01N 11/007* (2013.01); *F01N 1/006* (2013.01); *F01N 1/089* (2013.01); *F01N 3/10* (2013.01);
(Continued)

(58) Field of Classification Search
CPC ........ F01N 11/007; F01N 1/006; F01N 1/089; F01N 3/10; F01N 3/101; F01N 3/18; F01N 3/20; F01N 5/00; F01N 13/002; F01N 13/007; F01N 13/008; F01N 13/011; F01N 13/06; F01N 13/08; F01N 13/107; F01N 2340/02; F01N 2430/06; F01N 2470/00; Y02T 10/12
See application file for complete search history.

(56) References Cited

U.S. PATENT DOCUMENTS 3,445,196 A * 5/1969 Thomas ................ F01N 3/2839
422/171
3,644,098 A    2/1972 De Palma et al.
(Continued)

FOREIGN PATENT DOCUMENTS

CN    104279043 B    10/2016
EP    2930336 A1    10/2015
(Continued)

OTHER PUBLICATIONS https://ac.umicore.com/en/technologies/three-way-catalyst/, Umicore Automotive Catalysts, 2017 (Year: 2017).*
(Continued)

Primary Examiner — Brandon D Lee
(74) Attorney, Agent, or Firm — The Belles Group, P.C.

(57) ABSTRACT

In one aspect, a system is provided and includes an engine including an exhaust valve, an exhaust manifold downstream of the exhaust valve and a muffler downstream of the exhaust manifold. The system also includes a catalyst positioned downstream of the exhaust valve.

18 Claims, 7 Drawing Sheets

Related U.S. Application Data

(60) Provisional application No. 62/376,997, filed on Aug. 19, 2016.

(51) Int. Cl.

| | | |
|---|---|---|
| *F01N 5/00* | (2006.01) | |
| *F01N 13/00* | (2010.01) | |
| *F01N 13/08* | (2010.01) | |
| *F01N 1/08* | (2006.01) | |
| *F01N 3/20* | (2006.01) | |
| *F01N 13/06* | (2010.01) | |
| *F01N 3/18* | (2006.01) | |
| *F01N 1/00* | (2006.01) | |
| *F01N 13/10* | (2010.01) | |

(52) U.S. Cl.
CPC .............. *F01N 3/101* (2013.01); *F01N 3/18* (2013.01); *F01N 3/20* (2013.01); *F01N 5/00* (2013.01); *F01N 13/002* (2013.01); *F01N 13/007* (2013.01); *F01N 13/008* (2013.01); *F01N 13/011* (2014.06); *F01N 13/06* (2013.01); *F01N 13/08* (2013.01); *F01N 13/107* (2013.01); *F01N 2340/02* (2013.01); *F01N 2430/06* (2013.01); *F01N 2470/00* (2013.01); *Y02T 10/12* (2013.01)

(56) References Cited

U.S. PATENT DOCUMENTS

| | | | |
|---|---|---|---|
| 3,808,806 A | | 5/1974 | Nakamura et al. |
| 3,811,845 A | * | 5/1974 | Nakamura ............ F01N 3/2832 |
| | | | 60/299 |
| 3,911,676 A | | 10/1975 | Jensen |
| 3,972,184 A | | 8/1976 | Warren |
| 4,094,644 A | | 6/1978 | Wagner |
| 4,199,938 A | | 4/1980 | Nakase et al. |
| 4,285,909 A | | 8/1981 | Mizusawa et al. |
| 4,420,933 A | | 12/1983 | Kajitani et al. |
| 5,050,701 A | | 9/1991 | Okui et al. |
| 5,209,062 A | | 5/1993 | Vollenweider |
| 5,265,420 A | | 11/1993 | Rutschmann |
| 5,438,828 A | | 8/1995 | Fukae |
| 5,655,362 A | | 8/1997 | Kawajiri et al. |
| 5,722,237 A | | 3/1998 | Iida et al. |
| 5,736,690 A | | 4/1998 | Karlsson |
| 6,029,442 A | | 2/2000 | Caren et al. |
| 6,149,973 A | | 11/2000 | Foerster et al. |
| 6,174,504 B1 | | 1/2001 | Silver et al. |
| 6,247,304 B1 | | 6/2001 | Kim et al. |
| 6,311,482 B1 | | 11/2001 | Yamashita |
| 6,321,531 B1 | | 11/2001 | Caren et al. |
| 6,405,122 B1 | | 6/2002 | Yamaguchi |
| 6,466,859 B1 | | 10/2002 | Fujime |
| 6,497,851 B1 | | 12/2002 | Hu et al. |
| 6,851,257 B1 | | 2/2005 | Yoshida et al. |
| 6,880,328 B2 | | 4/2005 | Daetz et al. |
| 6,962,047 B2 | | 11/2005 | Yoshida et al. |
| 7,047,727 B2 | * | 5/2006 | Tanaka ................ F02D 41/1408 |
| | | | 60/284 |
| 7,193,333 B1 | | 3/2007 | Kitch |
| 7,552,587 B2 | | 6/2009 | Galligan |
| 7,661,265 B2 | | 2/2010 | Baumgartner |
| 8,151,561 B2 | | 4/2012 | Stiebinger |
| 8,755,941 B2 | | 6/2014 | Swanson et al. |
| 8,839,611 B2 | | 9/2014 | Turpin et al. |
| 8,905,007 B2 | | 12/2014 | Iizuka et al. |
| 8,935,995 B1 | | 1/2015 | Hawkins |
| 2001/0039242 A1 | | 11/2001 | Tanaka et al. |
| 2003/0085072 A1 | * | 5/2003 | Mukaida ............... F01N 3/2885 |
| | | | 181/282 |
| 2003/0089105 A1 | | 5/2003 | Reeves et al. |
| 2004/0050618 A1 | | 3/2004 | Marocco |
| 2004/0074231 A1 | | 4/2004 | Bruck |
| 2006/0137328 A1 | | 6/2006 | Takeshima et al. |
| 2007/0066479 A1 | | 3/2007 | Takeshima et al. |
| 2007/0119155 A1 | | 5/2007 | Tongu et al. |
| 2007/0144828 A1 | | 6/2007 | Galligan |
| 2008/0078165 A1 | | 4/2008 | Kim et al. |
| 2009/0126352 A1 | | 5/2009 | Surnilla et al. |
| 2009/0133649 A1 | | 5/2009 | Nowatari et al. |
| 2009/0229913 A1 | * | 9/2009 | Tonietto ................ F01N 1/083 |
| | | | 181/254 |
| 2009/0241540 A1 | * | 10/2009 | Robel .................. F02B 37/004 |
| | | | 60/276 |
| 2009/0259390 A1 | | 10/2009 | Yamaguchi |
| 2009/0260346 A1 | | 10/2009 | Gekas et al. |
| 2011/0082635 A1 | | 4/2011 | Midlam-Mohler et al. |
| 2011/0309053 A1 | * | 12/2011 | Baus .................... B23K 9/1062 |
| | | | 219/108 |
| 2012/0037101 A1 | | 2/2012 | Riegger et al. |
| 2012/0291761 A1 | | 11/2012 | Iizuka et al. |
| 2014/0044626 A1 | | 2/2014 | Greenwell |
| 2014/0102081 A1 | * | 4/2014 | Toner .................... F01N 3/2066 |
| | | | 60/274 |
| 2014/0140909 A1 | | 5/2014 | Qi et al. |
| 2014/0144777 A1 | | 5/2014 | Isomura |
| 2014/0234189 A1 | | 8/2014 | Clowes et al. |
| 2014/0242859 A1 | | 8/2014 | Ochiai |
| 2014/0261322 A1 | | 9/2014 | Geckler et al. |
| 2014/0298776 A1 | | 10/2014 | Turpin et al. |
| 2015/0118119 A1 | | 4/2015 | Chang et al. |
| 2015/0209769 A1 | | 7/2015 | Cavataio et al. |
| 2015/0226101 A1 | * | 8/2015 | Nishimura ............ F01N 3/103 |
| | | | 123/456 |
| 2016/0061081 A1 | * | 3/2016 | Ogimura ............... F01N 3/0892 |
| | | | 422/174 |
| 2016/0245169 A1 | | 8/2016 | Inomoto et al. |
| 2016/0258330 A1 | | 9/2016 | Yamada et al. |
| 2016/0340197 A1 | | 11/2016 | Zones et al. |
| 2017/0276043 A1 | * | 9/2017 | Khan .................... F01N 3/0335 |
| 2017/0284252 A1 | | 10/2017 | Corliss, II |
| 2017/0314489 A1 | | 11/2017 | Suzuki et al. |
| 2017/0314496 A1 | | 11/2017 | Suzuki et al. |
| 2019/0301341 A1 | * | 10/2019 | Kasuya ................ F01N 3/20 |

FOREIGN PATENT DOCUMENTS

| | | |
|---|---|---|
| KR | 10-0482872 B1 | 4/2005 |
| WO | 97/17532 A1 | 5/1997 |

OTHER PUBLICATIONS

Anonymous: "DuroStar DS4400 Review—Portable Generator Guide", May 9, 2013 (May 9, 2013), XP055431043, Retrieved from the Internet: URL:http://portablegeneratorguide.com/durostar-ds4400-review/ [retrieved on Dec. 1, 2017) the whole document.

International Search Report and Written Opinion for PCT Application No. PCT/US2017/047561 dated Feb. 6, 2018, 17 pages.

Catalytic Converters for Small Spark-Ignited Non handheld Utility Engines, Jan. 6, 1998, 10 pages.

International Preliminary Report on Patentability for PCT Application No. PCT/US2017/047561 dated Feb. 19, 2019, 9 pages.

\* cited by examiner

SYSTEM AND METHOD FOR LOW CO EMISSION ENGINE

RELATED APPLICATIONS

The present application is a continuation of U.S. application Ser. No. 16/318,123, filed Jan. 15, 2019 which claims the priority benefit of International Patent Application No. PCT/2017/47561, filed Aug. 18, 2017 which claims the priority benefit of Provisional Patent Application No. 62/376,997, filed Aug. 19, 2016, which is incorporated by reference herein.

FIELD OF THE INVENTION

The present disclosure generally relates to engines and, more particularly, to low emission engines.

BACKGROUND

Low emission engines can help reduce greenhouse gas emissions levels, air-borne pollutants and other impacts to the environment.

SUMMARY

According to one aspect, systems and methods provide a small gasoline engine with a catalyst positioned downstream of an exhaust valve.

Other systems, methods, features, and advantages is or will become apparent upon examination of the following figures and detailed description. It is intended that all such additional systems, methods, features, and advantages be included within this description and be protected by the accompanying claims.

According to one aspect, a system is provided and includes an engine including an exhaust valve, an exhaust manifold downstream of the exhaust valve and a muffler downstream of the exhaust manifold. The system also includes a catalyst positioned downstream of the exhaust valve.

According to one aspect, the engine may be a four-stroke gasoline engine.

According to one aspect, the system may further include a portable generator configured to be powered by the engine.

According to one aspect, the portable generator may include a frame at least partially supporting the engine and at least one wheel coupled to the frame.

According to one aspect, the portable generator may provide power less than or equal to about 10 kilowatts.

According to one aspect, the engine may be between about 80 cubic-centimeters and about 224 cubic centimeters.

According to one aspect, the engine may be between about 224 cubic-centimeters and about 999 cubic centimeters.

According to one aspect, the engine may be less than about 80 cubic-centimeters.

According to one aspect, the catalyst may be positioned in the muffler.

According to one aspect, a cross-section of the muffler may be oval shaped.

According to one aspect, the muffler may include an entrance cone for the catalyst.

According to one aspect, the catalyst may be positioned in the exhaust manifold.

According to one aspect, the system may further include an oxygen sensor positioned upstream of the catalyst.

According to one aspect, the catalyst and the oxygen sensor may be positioned in the exhaust manifold.

According to one aspect, the oxygen sensor may be positioned about 1 inch from the exhaust valve.

According to one aspect, the catalyst may be positioned between about 4 inches to about 10 inches from the exhaust valve.

According to one aspect, the catalyst may be positioned about 6 inches from the exhaust valve.

According to one aspect, the catalyst may be one of a plurality of catalysts.

According to one aspect, the engine may include a plurality of cylinders and the exhaust manifold may include a first portion associated with one of the plurality of cylinders and a second portion associated with another one of the plurality of cylinders. The catalyst may be a first catalyst positioned in the first portion of the exhaust manifold. The system may further include a second catalyst positioned in the second portion of the exhaust manifold.

According to one aspect, the system may further include a plurality of oxygen sensors. One of the plurality of oxygen sensors may be positioned in the first portion of the exhaust manifold and another one of the plurality of oxygen sensors may be positioned in the second portion of the exhaust manifold.

BRIEF DESCRIPTION OF THE DRAWINGS

In association with the following detailed description, reference is made to the accompanying drawings, where like numerals in different figures can refer to the same element. The features of the drawings are not necessarily drawn to scale.

DETAILED DESCRIPTION

Figure 1:
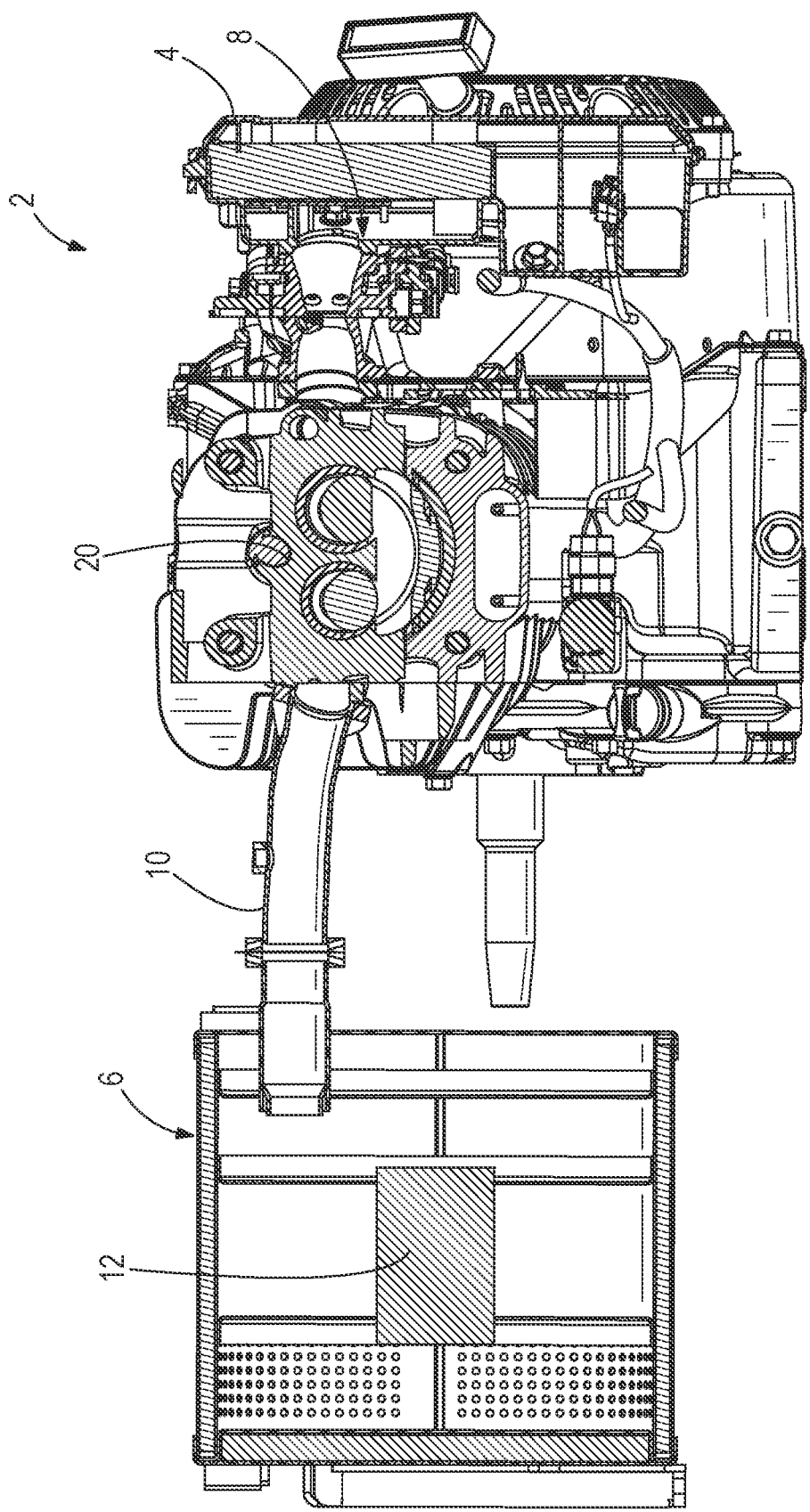
FIG. 1 is a schematic of an example engine emission reduction system.

While the disclosure may be susceptible to embodiment in different forms, there is shown in the drawings, and herein is described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It is further appreciated that in some embodiments, one or more elements illustrated by way of example in a drawing(s) may be eliminated and/or substituted with alternative elements within the scope of the disclosure.

Referring to FIG. 1, an engine emission reduction system (hereinafter referred to more simply as a "emission reduction system") 2 in accordance with at least one embodiment includes an engine 4, a muffler 6, electronic fuel injection (EFI) system 8 and/or exhaust manifold 10. In some embodiments, the muffler 6 includes a catalyst 12, but the catalyst 12 can be included in various other positions within the emission reduction system 2, as described in more detail below. The catalyst 12 can also be referred to as a catalytic converter. The engine emission reduction system 2 may be utilized with a large variety of engines 4 and all of such possibilities are intended to be within the spirit and scope of the present disclosure. In some embodiments, the engine 4 can include a small utility internal combustion engine, e.g., about 225 to about 999 cc, capable of being employed in a variety of applications including, for example, a variety of types of power machinery. For example, the engine 4 can include a four-stroke, twin cylinder KOHLER™ CH440 internal combustion engine manufactured by Kohler Company of Kohler, Wis. In some embodiments, the engine 4 may include any number of cylinders including one, twin or more cylinders. Also, in some embodiments, the engine 4 may be air cooled or liquid cooled. Further, in some embodiments, the engine 4 may have a vertical orientation or a horizontal orientation. Although not shown, it will be understood that in some cases the engine 4 can be employed to provide power in chipper/shredders, power washers, edgers, pumps, tillers, pressure washers, aerators, portable generators (e.g., from one to ten KW and/or able to be hand carried or moved by a person), log splitters, dethatchers, tamper/plate compactors, and other small equipment, etc. In some embodiments, it is also possible the emission reduction system 2 of FIG. 1 or other embodiments of emission reduction systems are implemented in conjunction with other types of engines (e.g., other than small utility engines) and/or in conjunction with other types of applications and/or equipment.

In FIG. 1, it is envisioned that the emission reduction system 2 provides a very low carbon-monoxide-emitting, portable gasoline engine, e.g. having one or two cylinders. In some embodiments, other numbers of cylinder engines can use the emission reduction system 2. The emission reduction system 2 can be installed by the engine's manufacturer, however, it is also envisioned that the emission reduction system 2 can be sold as an after-market add-on product capable of being installed by a party other than the engine's manufacturer. Additionally, in at least some of the embodiments, the emission reduction system 2 is implemented in conjunction with the engine 4, the muffler 6 and/or the EFI 8. Nevertheless, the emission reduction system 2 can be used with other types of engine components as well, and need not necessarily be utilized with the engine 4, the muffler 6 and/or the EFI 8.

Figure 5:
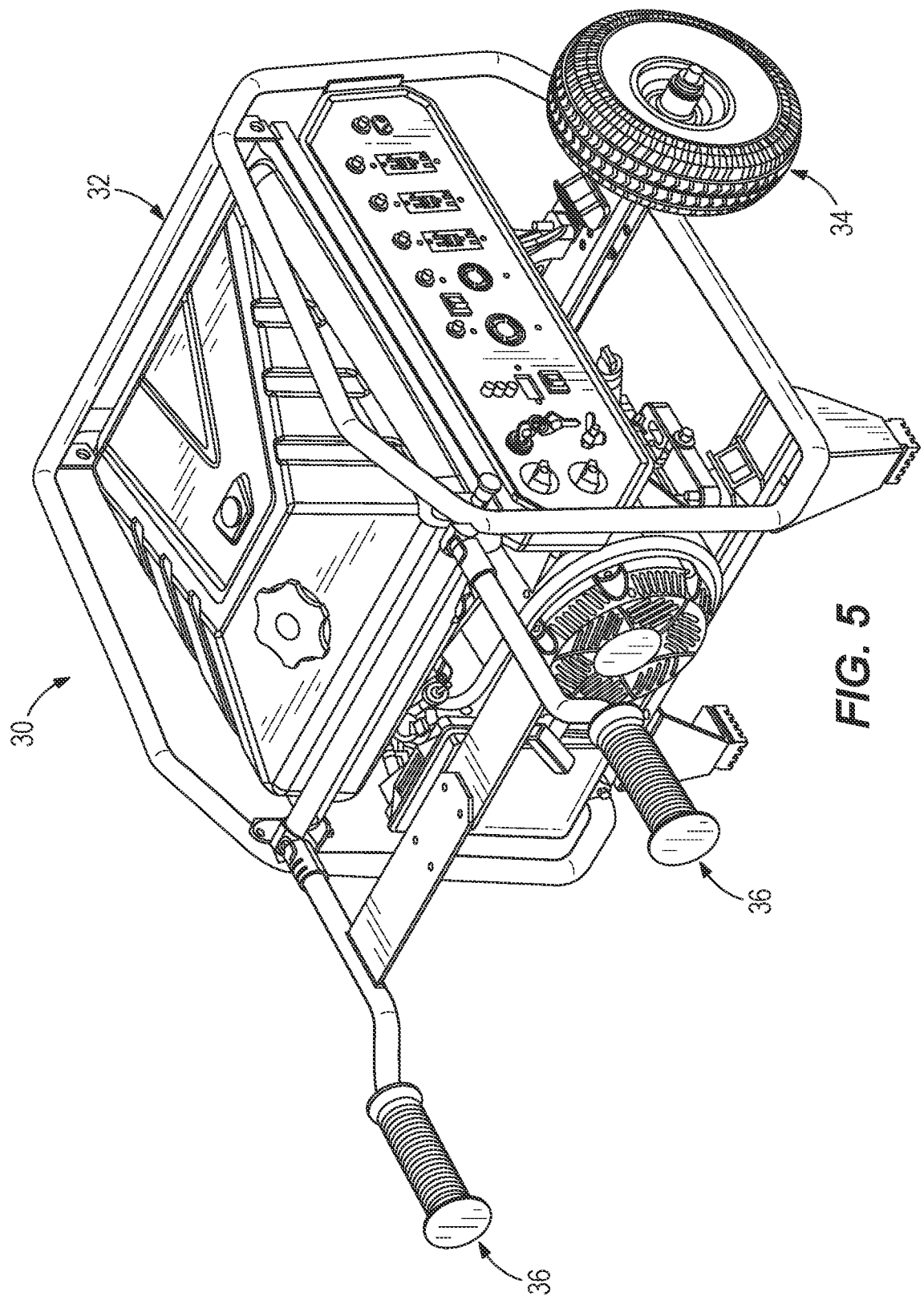
FIG. 5 is a top perspective view of an example device in which the engine emission reduction system may be incorporated.

One example of a device in which the emission reduction system 2 may be used is illustrated in FIG. 5. In this illustrated example, the device is a portable generator 30 and includes a frame 32, at least one wheel 34 coupled to the frame 30 (two wheels 32 in the illustrated example), and at least one handle 36 coupled to the frame 30 (two handles 36 in the illustrated example). In some embodiments, the portable generator 30 may include air cooled. In some embodiments, the portable generator 30 may provide about 10 kilowatts or less of power. In some embodiments, the portable generator 30 may be a Class 1 generator, a Class 2 generator or less than a Class 1 generator. A Class 1 generator may be defined as having an engine size of between about 80 cc (cubic-centimeter) to about 224 cc. A Class 2 generator may be defined as having an engine size of between about 224 cc to about 824 cc or 999 cc. In some embodiments, the portable generator 30 may have an engine size less than 80 cc. It should be understood that the portable generator 30 is only one example of the many types of devices in which the emission reduction system 2 may be utilized. Accordingly, the inclusion of the portable generator is not intended to be limiting upon the present disclosure, but is rather provided to demonstrate at least some of the principles of the present disclosure.

Figure 2:
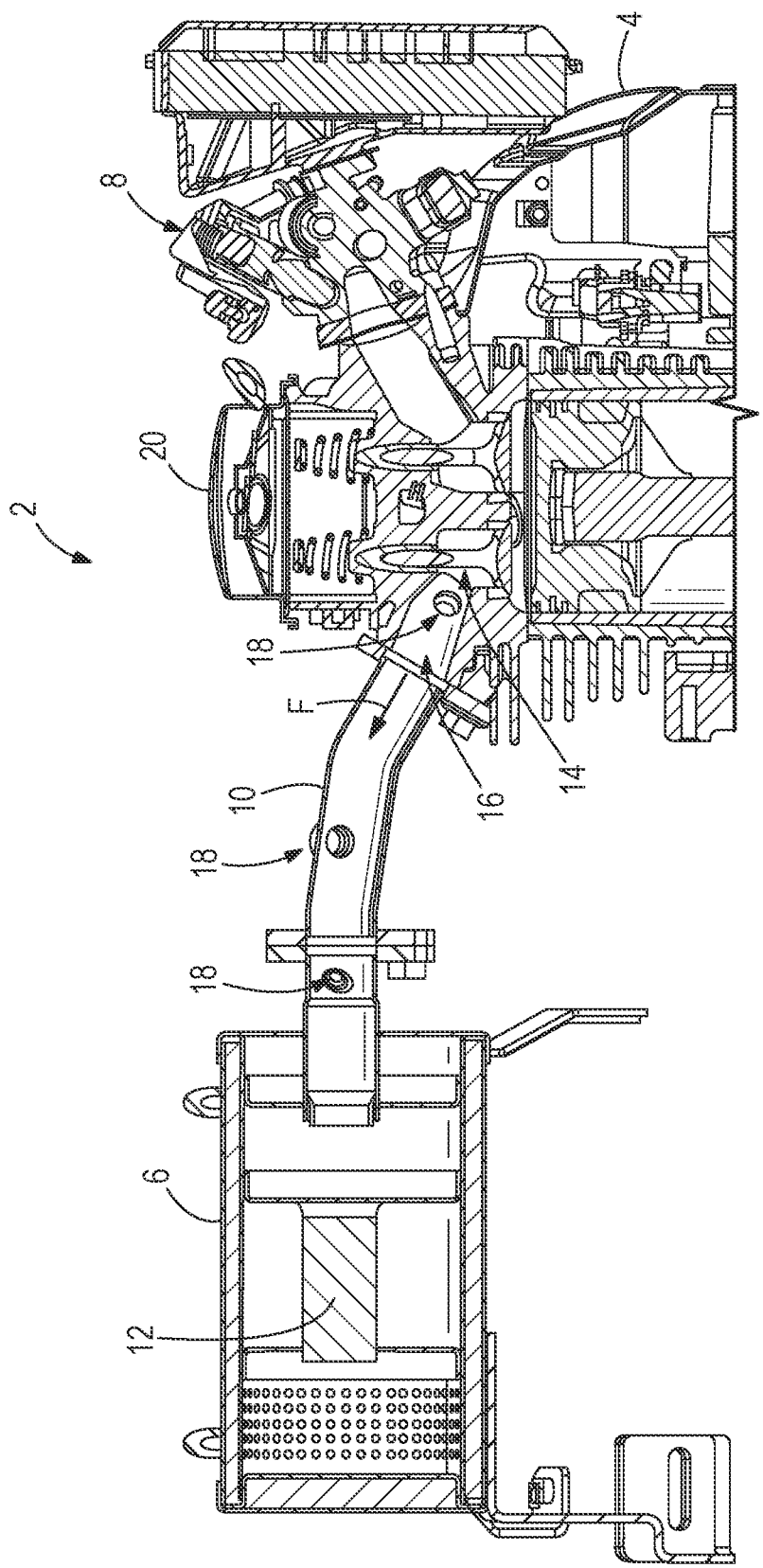
FIG. 2 is a schematic of a side-cutaway view of a portion of the example engine emission reduction system.
Figure 6:
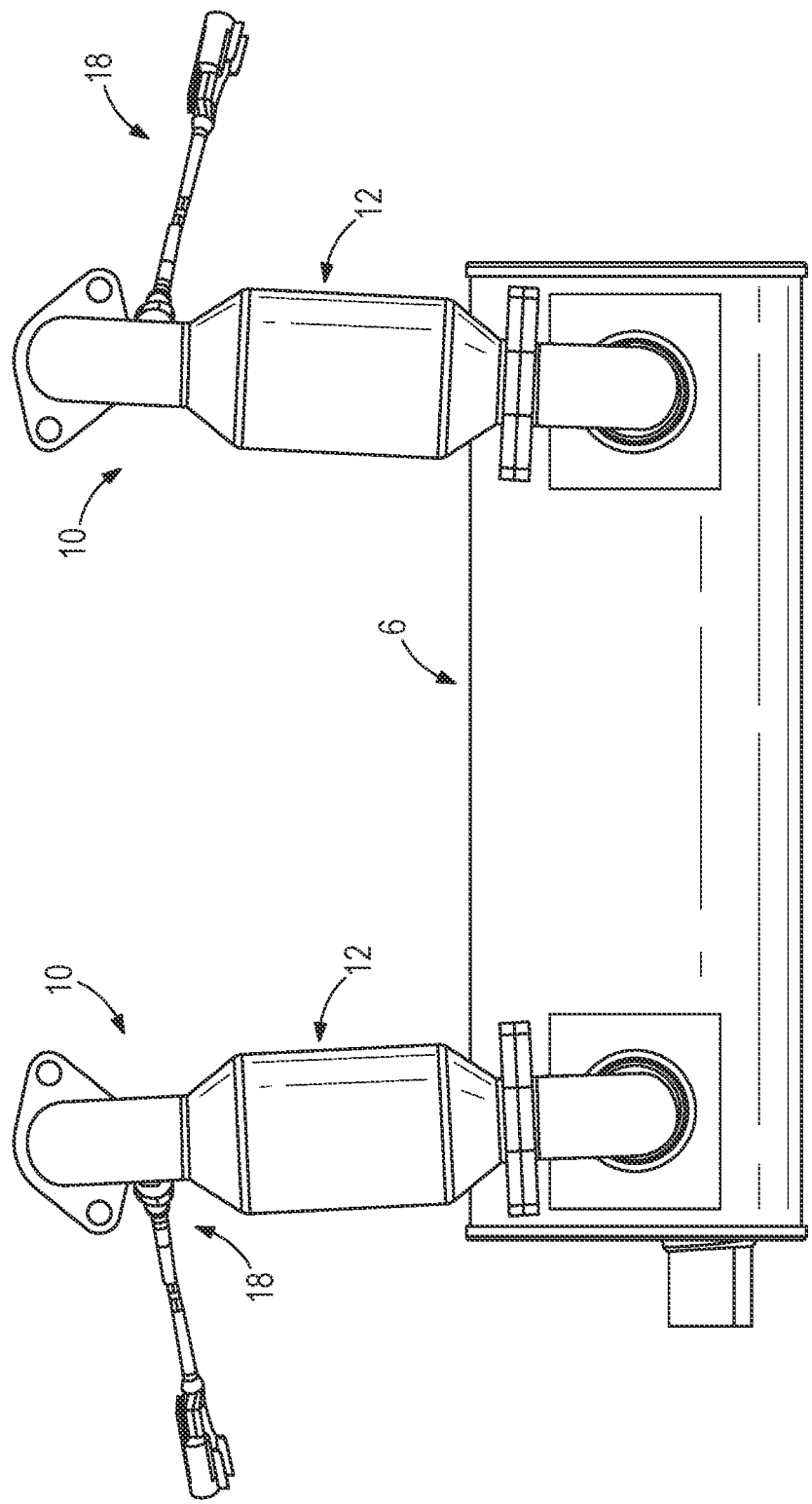
FIG. 6 is an elevational view of one example of a portion of an engine emission reduction system with examples of catalysts and examples of oxygen sensors positioned in an exhaust manifold.
Figure 7:
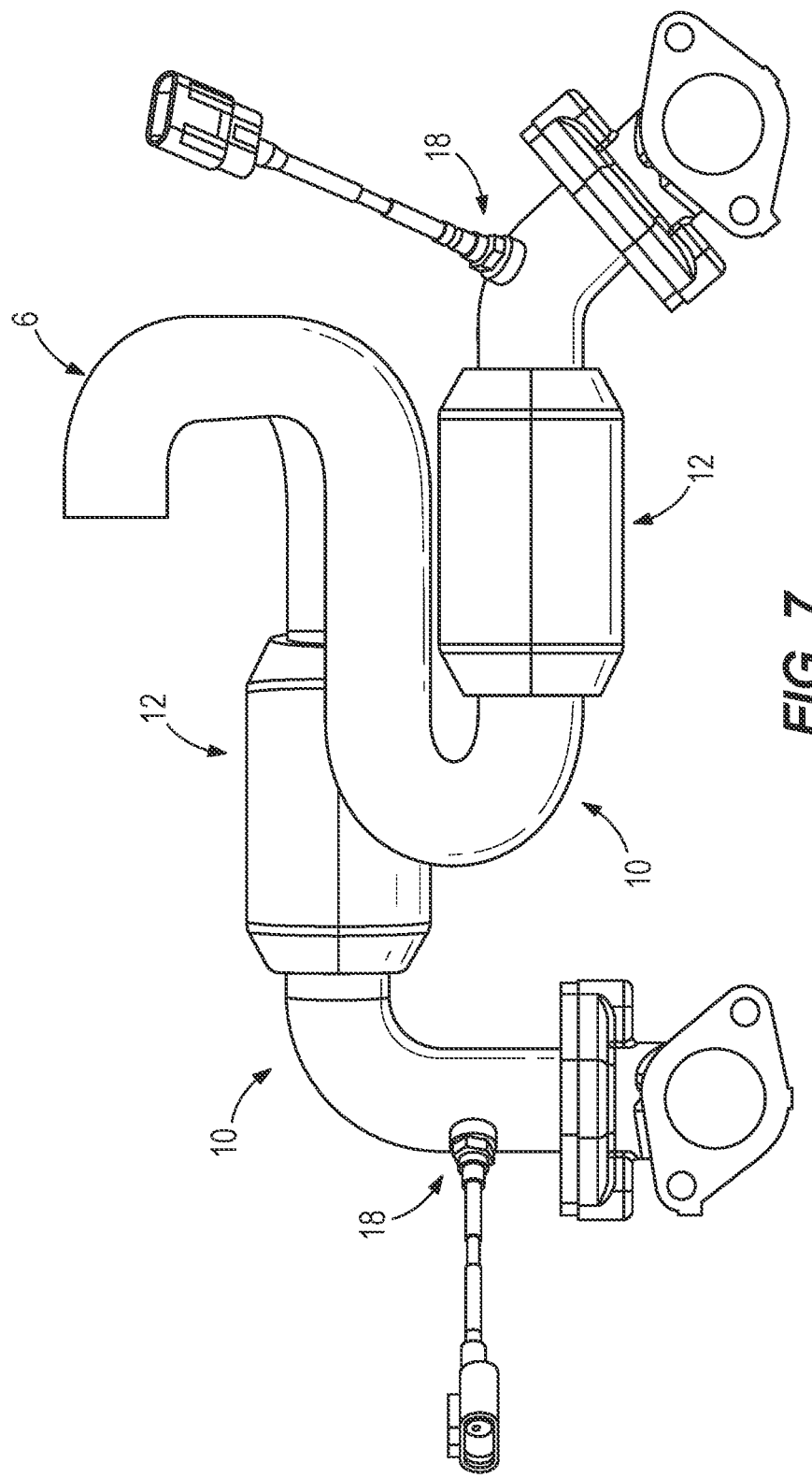
FIG. 7 is an elevational view of one example of a portion of an engine emission reduction system with examples of catalysts and examples of oxygen sensors positioned in an exhaust manifold

FIG. 2 is a schematic of a side-cutaway view of the example engine emission reduction system 2. In some embodiments, the catalyst 12 is positioned downstream from an exhaust valve 14. Downstream is determined by a flow direction of exhaust in the engine emission reduction system 2. The flow direction is represented by arrow F in FIG. 2. The exhaust valve 14 controls a release of exhaust from the engine 4, through the exhaust manifold 10 connected on one end with an exhaust port 16 and on the other end the muffler 6. In some embodiments, for example in FIGS. 3 and 4, the catalyst 12 is embedded or included in the muffler 6, e.g., a stainless-steel muffler, a low carbon steel, etc. Positioning the catalyst 12 in the muffler 6 may increase a life of the catalyst 12. In embodiments with the catalyst 12 positioned in the muffler 6, the muffler 6 may be made of stainless steel. In some embodiments, for example in FIGS. 6 and 7, the catalyst 12 is positioned in the exhaust manifold 10. For example, the catalyst 12 can be positioned in a can in piping of the manifold 10. Positioning the catalyst 12 in the manifold 10 may result in better performance of the catalyst 12. For example, reactions may still be taking place or a higher quantify of reactions are taking place in the manifold 10 versus further downstream. The catalyst 12 may perform better at reducing emissions in this environment than at positions further downstream. In embodiments with the catalyst 12 positioned in the manifold or locations other than the muffler 6, the muffler 6 may be made of low carbon steel or a different material other than stainless steel. In some embodiments, the catalyst 12 is positioned close to the exhaust valve 14, e.g., within about eight to about twenty-four inches of the exhaust valve 14. In some embodiments, the catalyst 12 is positioned close to the exhaust port 16, e.g., within about eight to about twenty-four inches of the exhaust port 16. In some embodiments, the catalyst 12 is positioned within the exhaust port 16. In a multi-cylinder engine 4, in some embodiments, there may be a catalyst 12 for each cylinder. Positioning the catalyst 12 in these manners relative to exhaust valve 14, exhaust port 16, etc. may be referred to as close coupled. That is, the catalyst 12 is close coupled to the exhaust valve 14, exhaust port 16, etc. Close coupling the catalyst 12 relative to these components of the engine emission reduction system 2 can provide temperature and/or performance advantages. In some embodiments, catalyst 12 may be positioned about 6 inches from the exhaust valve 14. In some embodiments, the catalyst 12 may be positioned between about 4 to 10 inches from the exhaust valve 14. In some embodiments, the catalyst 12 may be positioned between about 1 to about 24 inches. In some embodiments, the catalyst 12 is ceramic. In some embodiments, the catalyst 12 is metallic.

With continued reference to FIG. 2, in some embodiments, one or more oxygen (O2) sensor(s) 18 are positioned in the exhaust manifold 10. The O2 sensor(s) 18 can be positioned a determined distance, e.g., about 0.25 to about ten inches, from the exhaust valve 14. In some embodiments, the O2 sensor may be positioned about six inches from the exhaust valve 14. In some embodiments, the O2 sensor may be positioned about 1 inch form the exhaust valve 14. In some embodiments, the O2 sensor(s) 18 can be positioned a determined distance from the exhaust port 16. In some embodiments, the O2 sensor(s) 18 can be positioned before or upstream of the catalyst 12 with regard to a direction of the exhaust. In some embodiments, the O2 sensor(s) 18 may be positioned between the catalyst 12 and the exhaust valve 14. In some embodiments, the O2 sensor (s) 18 can be positioned before or upstream of the exhaust manifold 10, e.g., in the cylinder head 20.

In some embodiments, the engine 4 may include multiple cylinders. In such embodiments, the engine emission reduction system 2 may include a separate catalyst 12 and separate O2 sensor 18 for each cylinder of the engine 4. For example, with reference to FIGS. 6 and 7, the engine emission reduction system 2 includes a catalyst 12 and an O2 sensor 18 for each cylinder (two cylinders in the illustrated examples).

A transport distance of the fuel injector 8 to the O2 sensor 18 can affect an A:F dithering speed of the fuel into the exhaust stream. In some embodiments, minimizing or reducing the transport distance may speed-up the feedback of the system.

In some embodiments, the catalyst 12 may include a rare earth metal that absorbs O2 and wash coat to reduce pollutants including hydrocarbons (HC), carbon monoxide (CO) and nitrogen oxide (NOx). Many types of catalyst 12 can best reduce HC and CO when the engine 4 is run lean of stoichiometric (e.g., 14.7:1), e.g., about 15:1 lean. However, in some of these systems, NOx may be best reduced when the engine 4 runs rich, e.g., about 13.9:1 rich. With intentional dithering, the fuel injector 8 can be calibrated to run the engine 4 rich/lean/rich/lean for a determined amount of time, e.g., on the order of seconds. In some embodiments, a dithering frequency may be about 0.5 to about 4 Hz. The dithering can allow the catalyst 12 to re-oxygenate and best control the three main chemical pollutants, CO, NOx and HC, present in the exhaust. Additionally or alternatively, the dithering can be used to find a stoichiometric point of the engine 4.

A controller connected integrated with the fuel injector 8, and/or operably connected with the fuel injector 8, can control the rich/lean, etc. dithering speed and amplitude. The controller can include one or more processors and one or more memory devices. The memory can include one or more of a program memory, a cache, random access memory (RAM), a read only memory (ROM), a flash memory, a hard drive, etc., and/or other types of memory. In some embodiments, the memory can store instructions (e.g., compiled executable program instructions, uncompiled program code, some combination thereof, or the like)), which when performed (e.g., executed, translated, interpreted, and/or the like) by the processor, causes the processor to perform the dithering and any other processes described herein.

Figure 3:
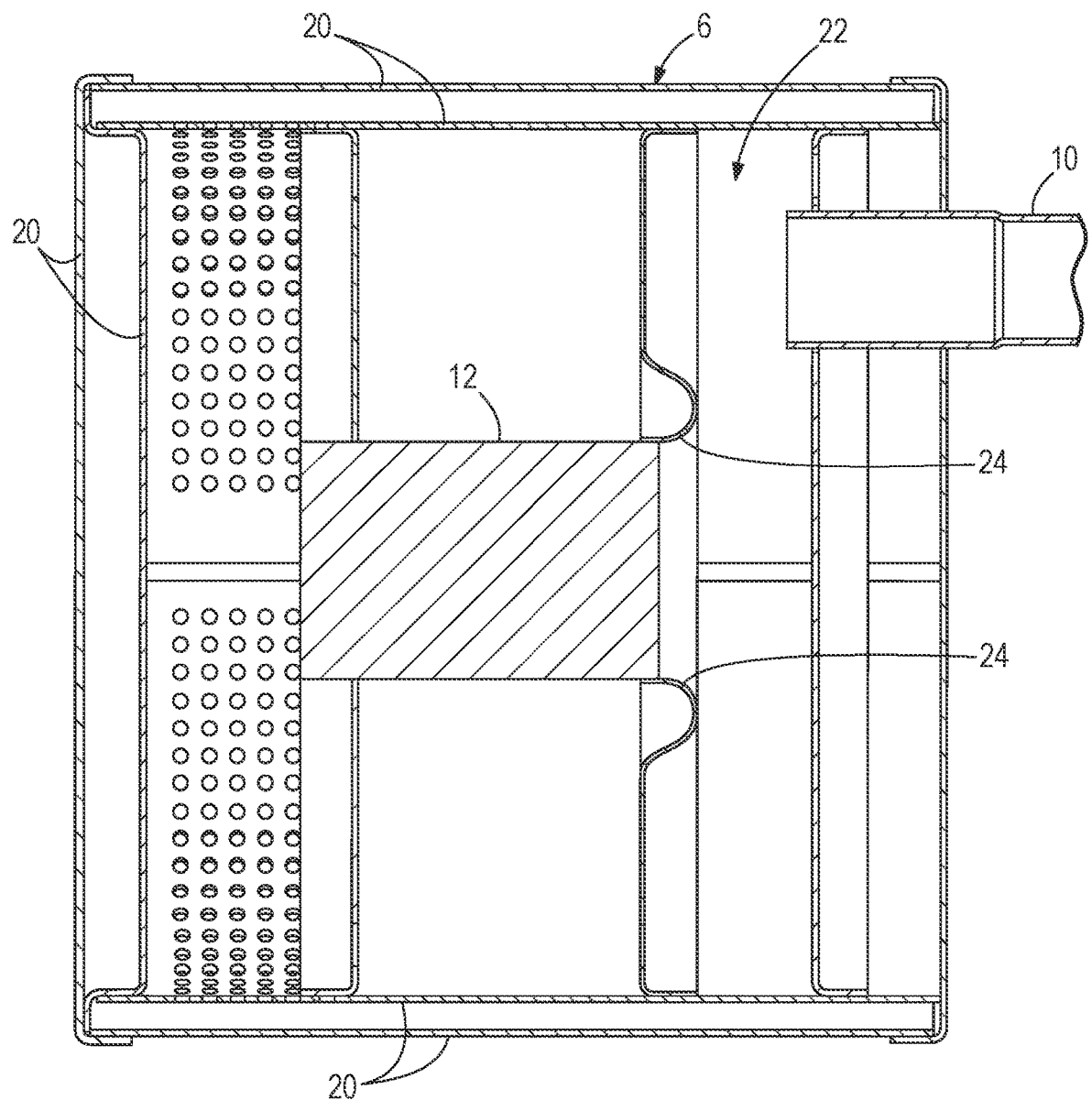
FIG. 3 is a schematic of an example muffler capable of being included in the engine emission reduction system.
Figure 4:
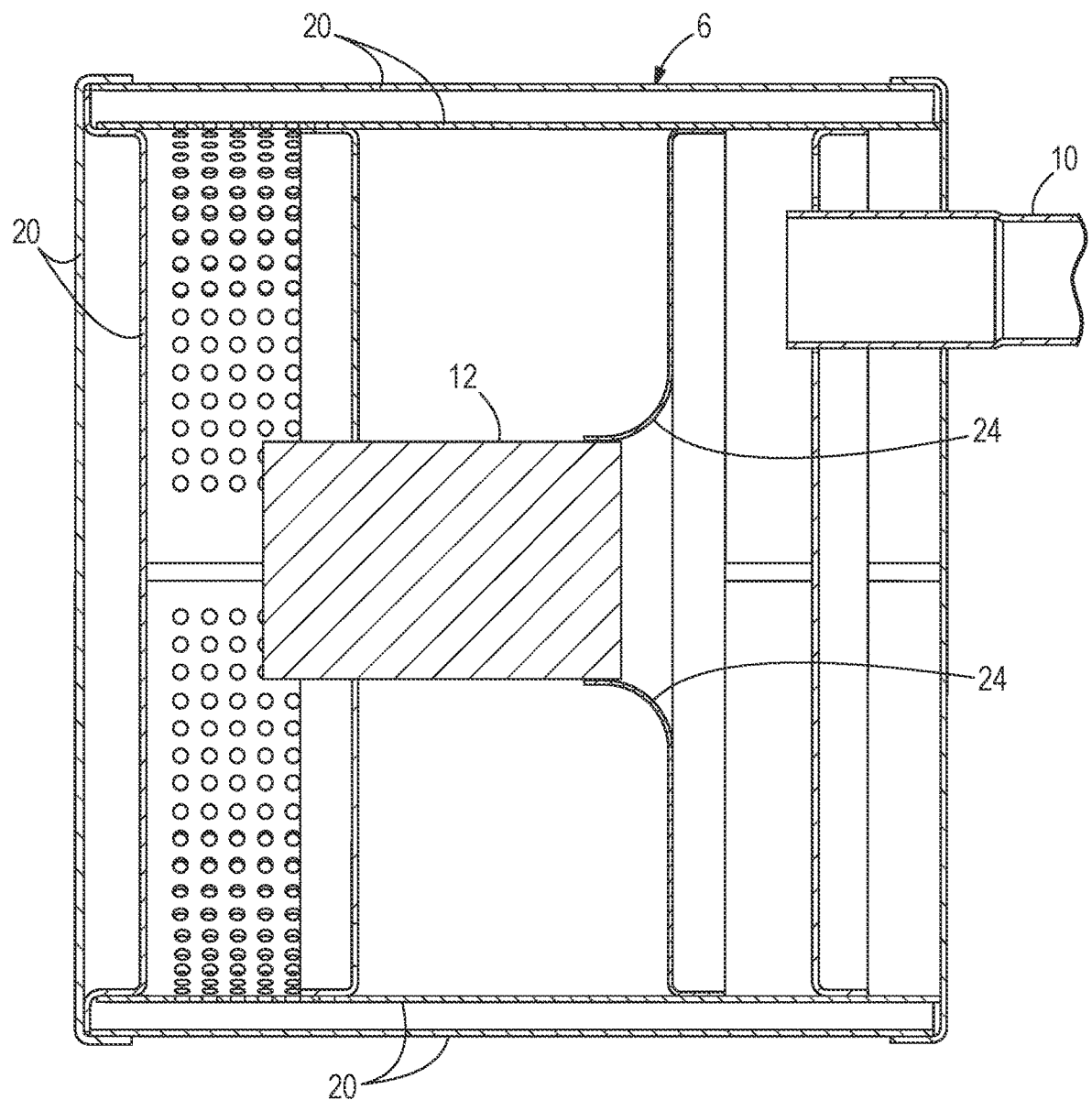
FIG. 4 is a schematic of an example muffler capable of being included in the engine emission reduction system.

FIGS. 3-4 are schematics of example implementations of the muffler 6. The muffler 6 can include double walls 20, e.g., to improve heat related performance of the catalyst 12 and noise performance of the muffler 6. A chamber 22 in front of the catalyst 12 can be sized for better exhaust flow distribution to the catalyst 12. In some embodiments, a catalyst volume is about 0.25 to about 0.75 of a volume of the chamber 22. In some embodiments, the surface area and air flow through the catalyst 12 can be optimized with a determined geometry of the interior of the muffler 6, e.g., by making one of the muffler partitions into a catalyst entrance cone 24, e.g., to funnel air to the catalyst 12. The shape of the entrance cone 24 can assist with maximizing an amount of surface area of the catalyst 12 impacted by the exhaust. In some embodiments, a cross section of the muffler 6 with a catalyst 12 is shaped like an oval (race-track). In other embodiments, other shapes can be used such as, for example, circular, polygonal perimetered shapes, arcuately perimetered shapes, or a combination of polygonal and arcuately perimetered shapes.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it is appreciated that different combinations of elements and/or functions may be provided by alternative embodiments without departing from the scope of the disclosure and the appended claims.

Many modifications and other embodiments set forth herein will come to mind to one skilled in the art having the benefit of the teachings presented in the foregoing descriptions and the associated drawings. Although specific terms are employed herein, they are used in a generic and descriptive sense only and not for purposes of limitation.

The invention claimed is:
1. A system, comprising:
an engine including an exhaust valve, an exhaust manifold downstream of the exhaust valve and a muffler downstream of the exhaust manifold;
a catalyst positioned within the muffler;
a fuel injector; and
a controller connected with the fuel injector, the controller comprising a processor connected to a memory device storing instructions which cause the processor to perform dithering to run the engine rich/lean for a period of seconds allowing the catalyst to re-oxygenate and control chemical pollutants in exhaust, wherein the dithering is used to find a stoichiometric point of the engine, and the controller is used to control the rich/lean run of the engine along with the dithering speed and amplitude by running the engine lean of stoichiometric to reduce hydrocarbons and carbon monoxide and by running the engine rich of stoichiometric to reduce nitrogen oxide;
wherein the muffler comprises a chamber, a muffler partition, and an inlet, the exhaust manifold fluidly coupled to the inlet and the inlet located between the exhaust manifold and the chamber;
wherein the muffler partition defines a wall of the chamber, the muffler partition comprising an entrance cone for the catalyst;
wherein the chamber is fluidly coupled to the catalyst, the inlet offset from the catalyst such that no portion of the catalyst aligns with the inlet, the inlet and the catalyst being parallel; and
wherein a cross-sectional area of the entrance cone decreases with increasing distance from the inlet.

2. The system of claim 1, wherein the engine is a four-stroke gasoline engine.

3. The system of claim 1, further comprising a portable generator configured to be powered by the engine.

4. The system of claim 3, wherein the portable generator includes a frame at least partially supporting the engine and at least one wheel coupled to the frame.

5. The system of claim 3, wherein the portable generator provides power less than or equal to 10 kilowatts.

6. The system of claim 3, wherein the engine is between 80 cubic-centimeters and 224 cubic centimeters.

7. The system of claim 3, wherein the engine is between 224 cubic-centimeters and 999 cubic centimeters.

8. The system of claim 3, wherein the engine is less than 80 cubic-centimeters.

9. The system of claim 1, wherein a cross-section of the muffler is oval shaped.

10. The system of claim 1, wherein the entrance cone comprises a raised ring portion protruding toward the inlet.

11. The system of claim 1, further including an oxygen sensor positioned upstream of the catalyst.

12. The system of claim 1, wherein the catalyst is one of a plurality of catalysts.

13. The system of claim 1 wherein the running the engine lean of stoichiometric to reduce hydrocarbons and carbon monoxide comprises running the engine at an air/fuel ratio of 15:1.

14. The system of claim 1 wherein the running the engine rich of stoichiometric to reduce nitrogen oxide comprises running the engine at an air/fuel ratio of 13.9:1.

15. The system of claim 1, wherein the muffler partition comprises an entrance cone for the catalyst, the entrance cone tapering toward the catalyst.

16. A system comprising:
    an engine, the engine comprising:
        an exhaust valve;
        an exhaust manifold fluidly coupled to the exhaust valve; and
        a muffler fluidly coupled to the exhaust manifold, the muffler comprising an inlet, a chamber, a muffler partition defining a wall of the chamber, and an outlet;
    a catalyst positioned within the muffler between the chamber and the outlet, the catalyst offset from the inlet such that no portion of the catalyst aligns with the inlet, the catalyst and the inlet being parallel;
    a fuel injector; and
    a controller configured to operate the fuel injector, the controller comprising a processor connected to a memory device storing instructions which cause the processor to dither an air/fuel ratio about a stoichiometric ratio;
    wherein the muffler partition comprises an entrance cone for the catalyst, the entrance cone tapering toward the catalyst.

17. The system of claim 16, wherein the entrance cone comprises a raised ring portion protruding toward the inlet.

18. The system of claim 16, wherein a cross-sectional area of the entrance cone decreases with increasing distance from the inlet.

* * * * *